US010095368B2

(12) United States Patent
Choi et al.

(10) Patent No.: US 10,095,368 B2
(45) Date of Patent: Oct. 9, 2018

(54) SCREEN CONTROL METHOD AND ELECTRONIC DEVICE THEREOF

(71) Applicant: Samsung Electronics Co., Ltd., Gyeonggi-do (KR)

(72) Inventors: Bo-Kun Choi, Seoul (KR); Doo-Suk Kang, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 328 days.

(21) Appl. No.: 14/226,257

(22) Filed: Mar. 26, 2014

(65) Prior Publication Data
US 2014/0325438 A1    Oct. 30, 2014

(30) Foreign Application Priority Data

Apr. 24, 2013    (KR) ........................ 10-2013-0045450

(51) Int. Cl.
*G06F 3/0481* (2013.01)
*G06F 3/0486* (2013.01)
*G06F 3/0488* (2013.01)

(52) U.S. Cl.
CPC .......... *G06F 3/0481* (2013.01); *G06F 3/0486* (2013.01); *G06F 3/0488* (2013.01)

(58) Field of Classification Search
CPC ..... G06F 3/0481; G06F 3/0486; G06F 3/0488
See application file for complete search history.

(56) References Cited

U.S. PATENT DOCUMENTS

| 6,583,781 | B1  |     | 6/2003  | Joshi et al.              |
|-----------|-----|-----|---------|---------------------------|
| 7,386,801 | B1  | *   | 6/2008  | Horvitz et al. ...... 715/764 |
| 2003/0145060 | A1 |   | 7/2003  | Martin                    |
| 2007/0038956 | A1 |   | 2/2007  | Morris                    |
| 2007/0136675 | A1 | * | 6/2007  | van Wyk et al. ...... 715/764 |
| 2007/0162866 | A1 |   | 7/2007  | Matthews et al.           |
| 2010/0100842 | A1 | * | 4/2010  | Kim ...................... 715/808 |
| 2010/0313156 | A1 | * | 12/2010 | Louch ............ G06F 3/0481 |
|           |     |     |         | 715/769                   |
| 2012/0054674 | A1 | * | 3/2012  | Beykpour ........ G06F 3/0481 |
|           |     |     |         | 715/788                   |

(Continued)

FOREIGN PATENT DOCUMENTS

| CN | 102508609 A | 6/2012 |
| JP | 2005-516273 A | 6/2005 |

(Continued)

OTHER PUBLICATIONS

Australian Search Report dated Jul. 25, 2016.

(Continued)

*Primary Examiner* — Ting Lee
(74) *Attorney, Agent, or Firm* — Cha & Reiter, LLC.

(57) ABSTRACT

A method and apparatus for controlling a screen in an electronic device are provided. The method includes displaying a pop-up window in a display area, disposed over another application displayed in the display area. If a movement of the pop-up window is detected, and a portion of the pop-up window reaches a predefined area of the display area, the pop-up window is removed from the display portion. A selectable icon is displayed allowing a user to redisplay the pop-up window or alter an operational state of the pop-up window.

18 Claims, 17 Drawing Sheets

(56) References Cited

U.S. PATENT DOCUMENTS

| | | | |
|---|---|---|---|
| 2013/0019150 A1* | 1/2013 | Zarom | 715/204 |
| 2013/0097560 A1* | 4/2013 | Park et al. | 715/811 |
| 2013/0174049 A1* | 7/2013 | Townsend et al. | 715/748 |
| 2013/0191775 A1* | 7/2013 | Lawson et al. | 715/784 |

FOREIGN PATENT DOCUMENTS

| | | |
|---|---|---|
| KR | 10-0791417 B1 | 1/2008 |
| KR | 10-2009-0039951 A | 4/2009 |
| KR | 10-2010-0058317 A | 6/2010 |
| KR | 10-2011-0126440 A | 11/2011 |
| WO | 2010/028406 A1 | 3/2010 |

OTHER PUBLICATIONS

Australian Search Report, dated Nov. 3, 2016.
European Search Report, dated Dec. 6, 2016.
Australian Office Action dated Feb. 2, 2017.
European Office Action dated Apr. 13, 2017.
Australian Notice of Allowance dated Apr. 13, 2017.
Chinese Search Report dated Oct. 26, 2017.
European Search Report dated May 7, 2018.

* cited by examiner

SCREEN CONTROL METHOD AND ELECTRONIC DEVICE THEREOF

CROSS REFERENCE TO RELATED APPLICATION

This application claims the benefit under 35 U.S.C. § 119(a) of a Korean patent application filed in the Korean Intellectual Property Office on Apr. 24, 2013 and assigned Serial No. 10-2013-0045450, the entire disclosure of which is hereby incorporated by reference.

TECHNICAL FIELD

The present disclosure relates to a method and apparatus for controlling a screen in an electronic device.

BACKGROUND

Electronic devices have become necessities of modern life due to easiness of portability, and are under development into multimedia devices for providing various services such as audio and video telephony functions, information input and output functions, and data storage functions.

Recently, the electronic device provides an application program (e.g., a pop-up player, a pop-up browser, and a pop-up dictionary) which can operate via a pop-up window.

When the pop-up window is used, there is an advantage in that a user of the electronic device can simultaneously utilize a plurality of application programs. However, since a display portion of the electronic device has a limited size, there is an area hidden by the pop-up window. Thus, the user of the electronic device inconveniently has to move the pop-up window to check for the area hidden by the pop-up window.

In addition, if an application hidden by the pop-up window is intended to be utilized in a full screen, the user of the electronic device can utilize the application in the full screen after closing the pop-up window. If the closed pop-up window is re-utilized, the user of the electronic device must repetitively perform an operation of executing the application for the pop-up window and switching the application program to a pop-up window mode.

Therefore, there is a need for an interface for controlling a pop-up window in an electronic device.

Accordingly, the present disclosure provides a method and apparatus for controlling a screen in an electronic device.

SUMMARY

An aspect of the present disclosure is to solve at least the above-mentioned problems and/or disadvantages and to provide at least the advantages described below. Accordingly, an aspect of the present disclosure is to provide an apparatus and method for controlling a pop-up window screen in an electronic device.

Another aspect of the present disclosure is to provide an apparatus and method for removing a pop-up window from a display portion in an electronic device.

Another aspect of the present disclosure is to provide an apparatus and method for redisplaying a pop-up window of which display is removed in an electronic device.

In accordance with an aspect of the present disclosure, a method of controlling a screen in an electronic device is provided. The method includes displaying a pop-up window in a display portion, if a position movement is detected on the pop-up window, confirming whether a first area of the pop-up window reaches a second area of the display portion, and if the first area of the pop-up window reaches the second area of the display portion, removing the pop-up window from the display portion.

In accordance with another aspect of the present disclosure, an electronic device is provided. The electronic device includes a display unit, at least one processor, at least one memory, and at least one program stored in the memory and configured to be executable by the at least one processor, wherein the processor displays a pop-up window in a display portion, if a position movement is detected on the pop-up window, confirms whether a first area of the pop-up window reaches a second area of the display portion, and if the first area of the pop-up window reaches the second area of the display portion, removes the pop-up window from the display portion.

BRIEF DESCRIPTION OF THE DRAWINGS

The above and other aspects, features and advantages of certain example embodiments of the present disclosure will be more apparent from the following detailed description taken in conjunction with the accompanying drawings, in which.

DETAILED DESCRIPTION

Example embodiments of the present disclosure will be described herein below with reference to the accompanying drawings. In the following description, well-known functions or constructions may be summarized for the sake of brevity and clarity.

The present disclosure described hereafter relates to a technique for controlling a screen of an application program currently displayed via a pop-up window in an electronic device.

In the following description, the electronic device may include a mobile communication terminal having a display, a Personal Digital Assistant (PDA), a laptop computer, a smart phone, a netbook, a Mobile Internet Device (MID), a Ultra Mobile Personal Computer (UMPC), a Tablet Personal Computer (TPC), a navigator, a smart Television (TV), a digital camera, a refrigerator, a digital watch, and an Motion Picture Experts Group Layer 3 (MP3) player.

Figure 1:
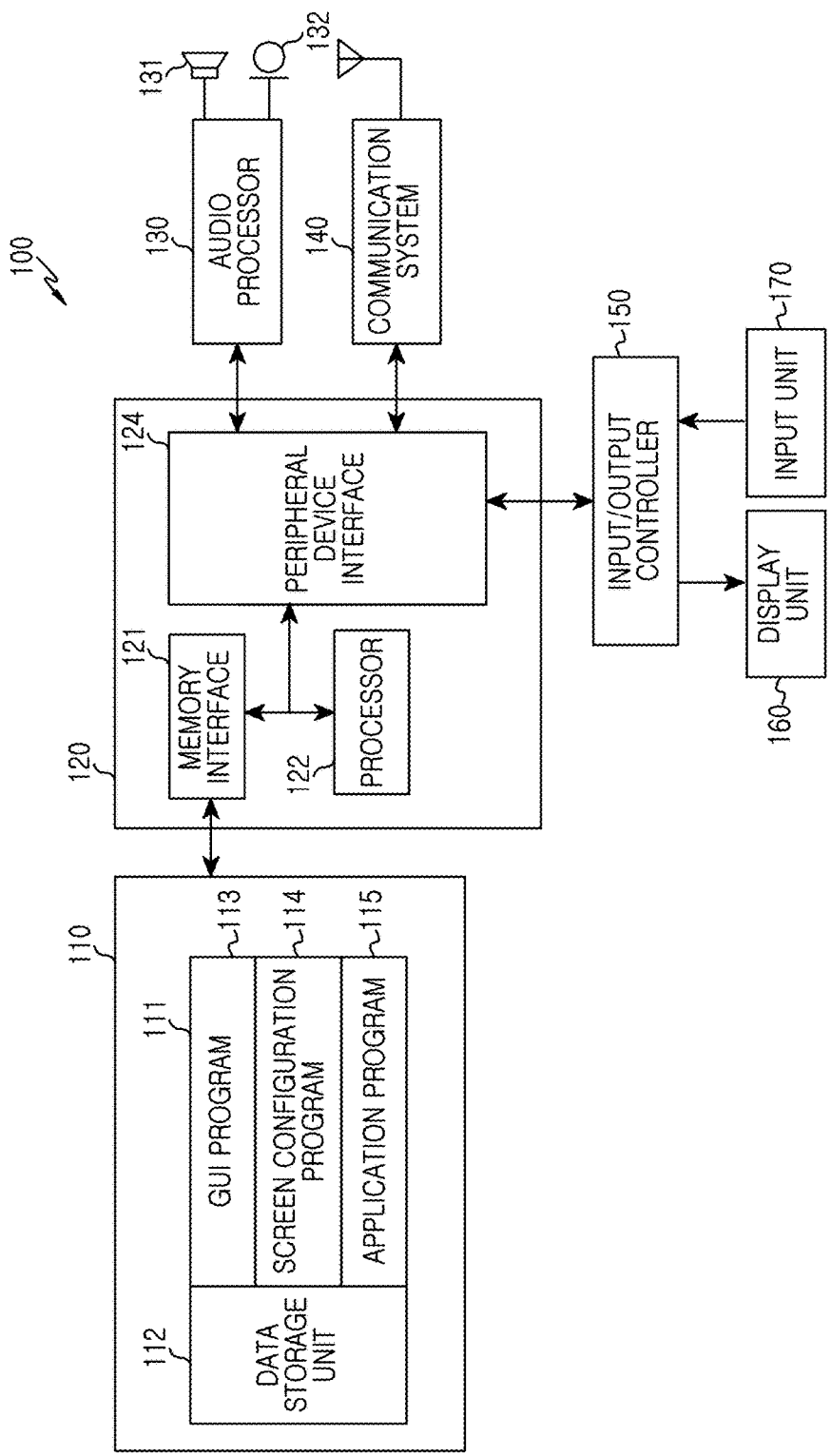
FIG. 1 is a block diagram illustrating an example structure of an electronic device according to an example embodiment of the present disclosure.

FIG. 1 is a block diagram illustrating a structure of an electronic device according to an example embodiment of the present disclosure.

Referring to FIG. 1, an electronic device 100 may include a memory 110, a processor unit 120, an audio processor 130, a communication system 140, an input/output controller 150, a display unit 160, and an input unit 170. Herein, the memory 110 may be plural in number.

Each component will be described below in detail.

The memory 110 includes a program storage unit 111 for storing a program for controlling an operation of the electronic device 100 and a data storage unit 112 for storing data generated during the execution of the program.

The program storage unit 111 may include a Graphic User Interface (GUI) program 113, a screen configuration program 114, and at least one application program 115. Herein, the program included in the program storage unit 111 is a group of instructions, and may be expressed as an instruction set.

The GUI program 113 may include at least one software component for providing a graphic user interface on the display unit 160. For one example, the GUI program 113 may include an instruction for displaying information of an application program driven by the processor 122 to the display unit 160. For another example, the GUI program 113 may control the display unit 160 to display at least one application program via a pop-up window by using the screen configuration program 114. For another example, the GUI program 113 may control the display unit 160 to remove display of at least one application program which is displayed via the pop-up window by using the screen configuration program 114.

Figure 6A:
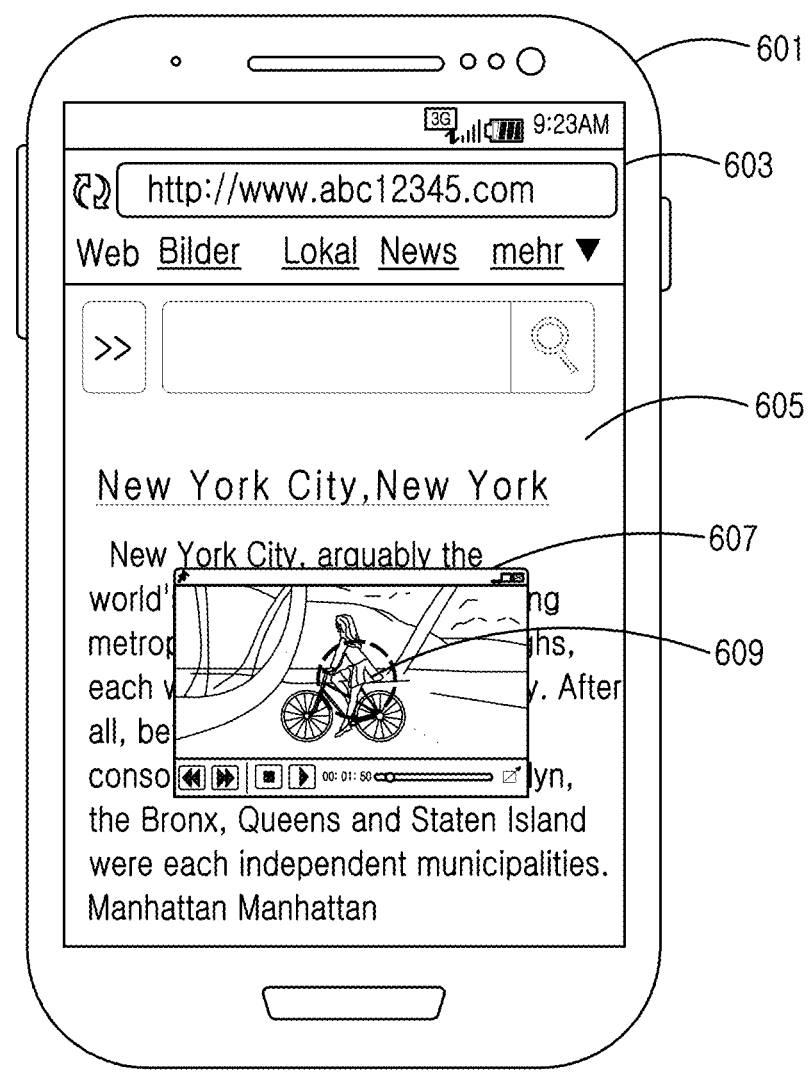
FIG. 6A, FIG. 6B, FIG. 6C and FIG. 6D illustrate a screen configuration for controlling a screen of an application program currently displayed via a pop-up window in an electronic device according to an example embodiment of the present disclosure.
Figure 6B:
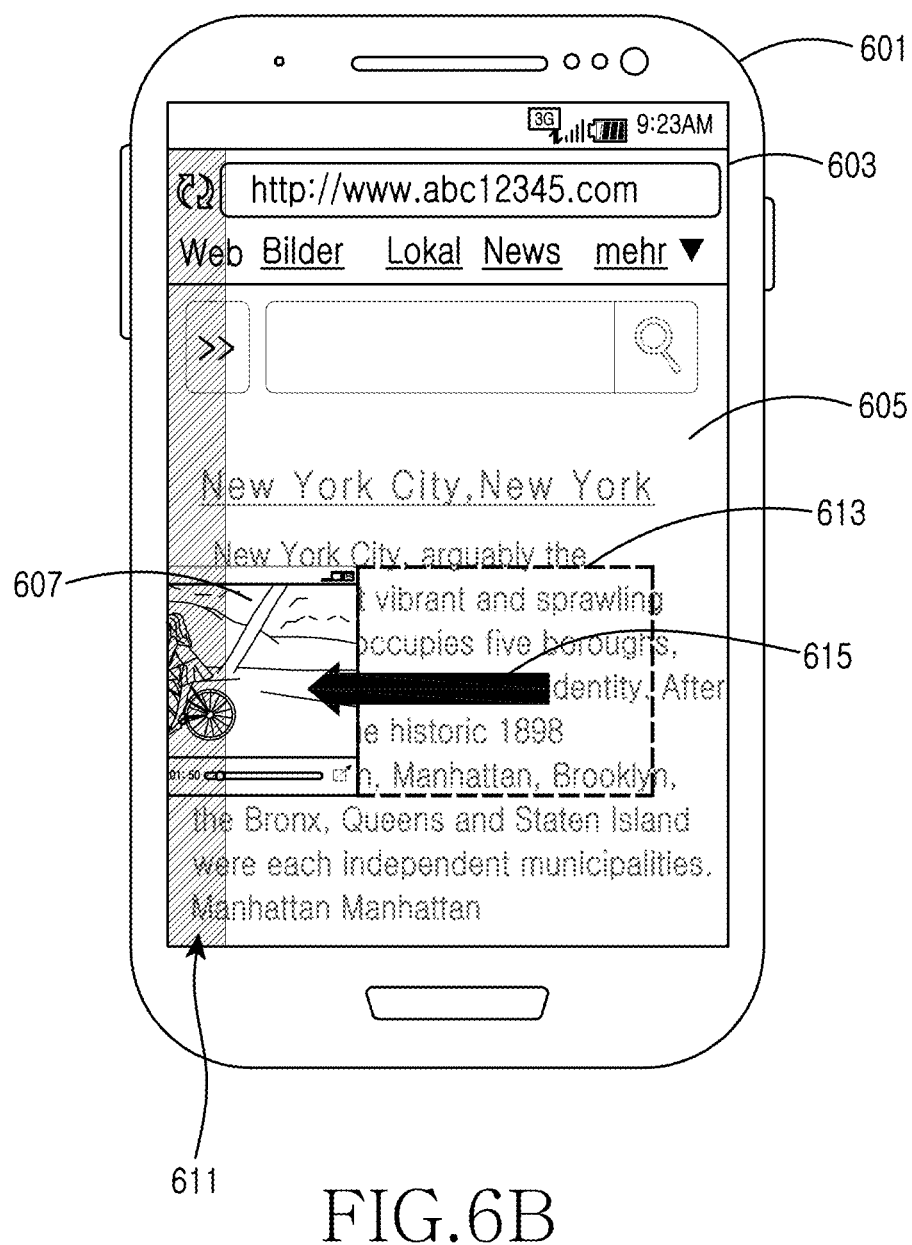
Figure 6C:
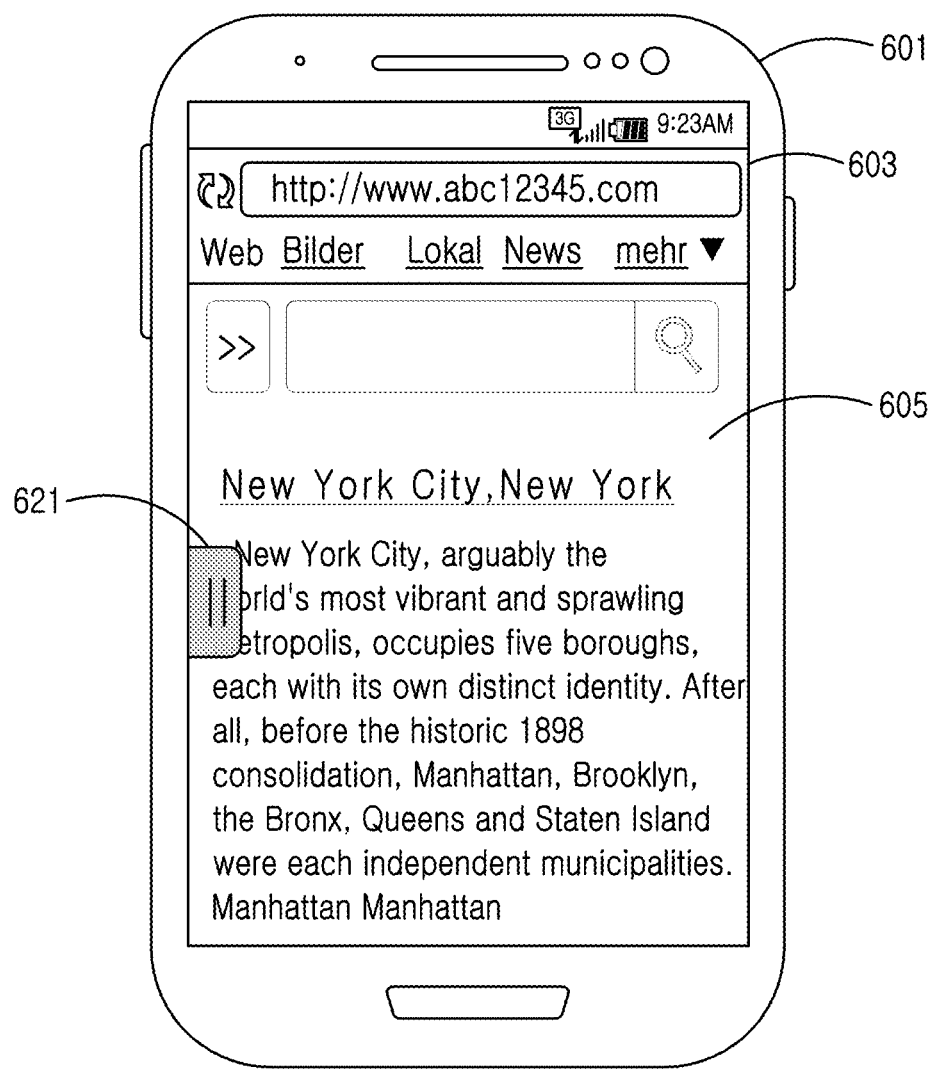

The screen configuration program 114 may include at least one software component for controlling a screen of an application program which is currently displayed via the pop-up window in the electronic device. For example, if the pop-up window is displayed in the display unit 160, the screen configuration program 114 determines whether a position movement is detected on the pop-up window. If the position movement is detected on the pop-up window, the screen configuration program 114 determines a display type of the pop-up window. Wherein the display type of the pop-up is comprising a reposition of the pop-up, remove display of the pop-up, redisplaying of the pop-up. For example, as illustrated in FIG. 6A and FIG. 6B, if a position movement is detected on a video program 607 displayed in a display portion (unit) 603 via a pop-up, the screen configuration program 114 provides a control to remove the display of the video program 607 from the display portion 603 as illustrated in FIG. 6C. In this case, the screen configuration program 114 may also provide a control to display an icon 621 capable of redisplaying the video program 607 of which the display is removed from the display portion. For example, if at least one input is detected for the icon 621 among a position movement input, a touch input made for a time longer than a reference time, and a touch input attempted more than reference times, the screen configuration program 114 can provide a control to redisplay the video program of which the display is removed from the display portion as illustrated in FIG. 6A.

In addition, if the position movement is detected on the pop-up window, the screen configuration program 114 may also determine whether a reference coordinate of the pop-up window reaches a reference area of the display portion. If the reference coordinate of the pop-up window reaches the reference area, the screen configuration program 114 may determine the display type of the pop-up window.

In addition, if the position movement is detected on the pop-up window, the screen configuration program 114 may determine whether a position movement speed reaches a reference speed. If the position movement speed for the pop-up window reaches the reference speed, the screen configuration program 114 may determine the display type of the pop-up window.

In addition, if the position movement is detected from the pop-up window, the screen configuration program 114 may perform, in combination, the operation of determining whether the reference coordinate of the pop-up window reaches the reference area and the operation of determining whether the position movement speed reaches the reference speed.

The application program 115 includes a software component for at least one application installed in the electronic device 100.

The processor unit 120 includes a memory interface 121, at least one processor 122, and a peripheral device interface 124. Herein, the memory interface 121, the at least one processor 122, and the peripheral device interface 124 included in the processor unit 120 may be integrated as at least one integrated circuit or may be implemented as separate components.

The memory interface 121 controls an access to the memory 110 with respect to a component such as the processor 122 or the peripheral device interface 124.

The processor 122 controls the electronic device 100 to provide various multimedia services by using at least one software program. In this case, the processor 122 executes at least one program stored in the memory 110 to provide a service according to the program.

The peripheral device interface 124 controls a connection of the input/output controller 150, the processor 122, and the memory interface 121 of the electronic device 100.

The audio processor 130 provides an audio interface between the user and the electronic device 100 via a speaker 131 and a microphone 132.

The communication system 140 performs a communication function for voice communication and data communication. In this case, the communication system 140 may be divided into a plurality of communication sub-modules for supporting different communication networks. For example, although not limited thereto, the communication network includes a Global System for Mobile Communication (GSM) network, an Enhanced Data GSM Environment (EDGE) network, a Code Division Multiple Access (CDMA) network, a W-Code Division Multiple Access (W-CDMA) network, a Long Term Evolution (LTE) network, an Orthogonal Frequency Division Multiple Access (OFDMA) network, a Wireless Local Area Network (WLAN), a Bluetooth network, Near Field Communication (NFC), etc.

The input/output controller 150 provides an interface between an input/output unit including the display unit 160 and the input unit 170 and the peripheral device interface 124.

The display unit 160 displays status information of the electronic device 100, a character input by a user, a moving picture, and a still picture. For one example, the display unit 160 displays application information driven by the processor 122 under the control of the GUI program 113. For another example, the display unit 160 displays at least one application program via the pop-up window under the control of the GUI program 113. For another example, the display unit 160 may remove the display of the at least one application program displayed via the pop-up window under the control of the GUI program 113.

The input unit 170 provides input data generated by a user's selection to the processor unit 120 via the input/output controller 150. In this case, the input unit 170 may include a keypad including at least one hardware buttons and a touch screen for sensing touch information. For example, the input unit 170 provides touch information including a touch sensed through the touch screen, a touch movement, and a touch release to the processor 122 via the input/output controller 150.

Figure 2:
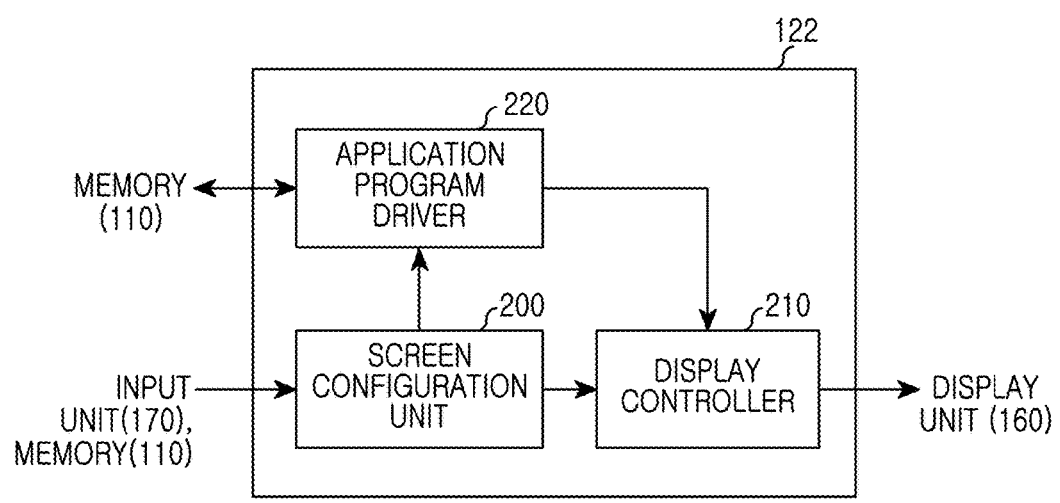
FIG. 2 is a block diagram illustrating a detailed example structure of a processor according to an embodiment of the present disclosure.

FIG. 2 is a block diagram illustrating a detailed structure of a processor according to an embodiment of the present disclosure.

Referring to FIG. 2, the processor 122 includes a screen configuration unit 200, a display controller 210, and an application program driver 220.

The screen configuration unit 200 executes the screen configuration program 114 stored in the program storage unit 111 to control a screen of an application program currently displayed via a pop-up window. For example, if the pop-up window is displayed in the display unit 160, the screen configuration unit 200 determines whether a position movement is detected on the pop-up window. If the position movement is detected on the pop-up window, the screen configuration unit 200 determines a display type of the pop-up window. For example, as illustrated in FIG. 6A and FIG. 6B, if movement of the video program 607 is detected attaining certain conditions, the screen configuration unit 200 removes the display of the video program 607 from the display portion 603, as illustrated in FIG. 6C. In this case, the screen configuration unit 200 may also display an icon 621 capable of redisplaying the video program 607 when selected. For example, a number of inputs may be detected for the icon 621 to trigger redisplay of the video program 607, such as a position movement input, a touch input made for a time longer than a reference time, and a touch input attempted more than reference times. Any such input may cause the screen configuration unit 200 to redisplay the video program 607, returning the device to the state illustrated in FIG. 6A.

In addition, as seen in FIG. 6B, if the position movement is detected on the pop-up window, the screen configuration unit 200 may also determine whether a reference coordinate of the pop-up window reaches a reference area 611 of the display portion. If the reference coordinate of the pop-up window reaches the reference area 611, the screen configuration unit 200 may determine the display type of the pop-up window.

In addition, if the position movement is detected on the pop-up window, the screen configuration unit 200 may determine whether a position movement speed reaches a reference speed. If the position movement speed for the pop-up window reaches the reference speed, the screen configuration unit 200 may remove the pop-up window from display.

In addition, if the position movement is detected from the pop-up window, the screen configuration unit 200 may perform, in combination, the operation of determining whether the reference coordinate of the pop-up window reaches the reference area and the operation of determining whether the position movement speed reaches the reference speed.

The display controller 210 executes the GUI program 113 stored in the program storage unit 111 and thus controls the display unit 160 to display a graphic user interface. For one example, the display controller 210 controls the display unit 160 to display information of an application program driven by the processor 122. In another example, the display controller 210 may control the display unit 160 to display at least one application program via the pop-up window by using the screen configuration unit 200. In another example, the display controller 210 may control the display unit 160 to remove the display of at least one application program which is displayed via the pop-up window by using the screen configuration unit 200.

The application program driver 220 executes at least one application program 115 stored in the program storage unit 111 to provide a service based on a corresponding application program. In this case, the application program driver 220 may receive display type information of the application program from the screen configuration unit 200.

In the aforementioned embodiment, the electronic device 100 controls the screen of the application program currently displayed via the pop-up window by using the processor 122 including the screen configuration unit 200.

In another example embodiment, the electronic device 100 may include an additional screen configuration module for controlling a screen of an application program currently displayed via the pop-up window.

Figure 3:
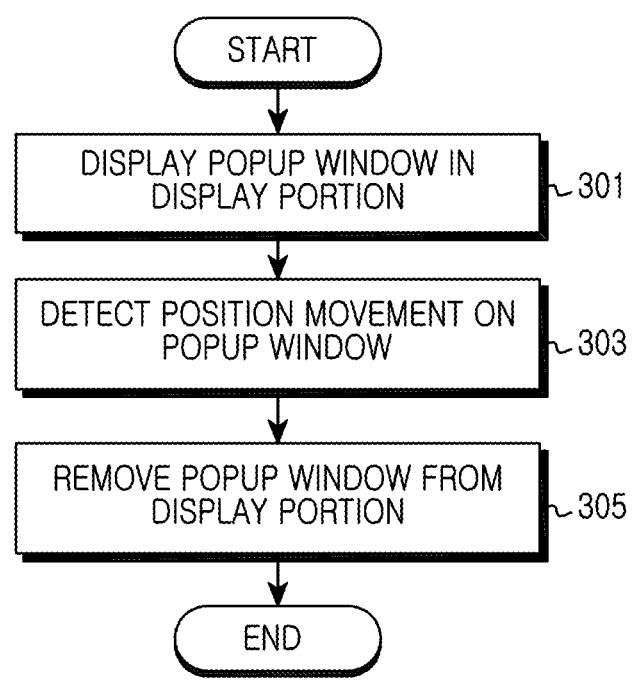
FIG. 3 is a flowchart illustrating a process of controlling a screen of an application program currently displayed via a pop-up window in an electronic device according to an example embodiment of the present disclosure.

FIG. 3 is a flowchart illustrating a process of controlling a screen of an application program currently displayed via a pop-up window in an electronic device according to an example embodiment of the present disclosure.

Referring to FIG. 3, the electronic device displays the pop-up window in a display portion in step 301. For example, as illustrated in FIG. 6A, an electronic device 601 displays a video program 607 via a display portion 603 in such a manner that the video program 607 is disposed above an Internet program 605.

In step 303, upon detection of a movement of the pop-up window 607, the electronic device determines whether a reference coordinate 609 of the pop-up window reaches a reference area of the display portion. For example, as illustrated in FIG. 6A and FIG. 6B, if a position movement is detected on the video program 607 displayed in the display portion 603 via a pop-up, the electronic device 601 determines whether a reference coordinate 609 of the video program 607 reaches a reference area 611 (FIG. 6B) of the display portion 603.

In step 305, if the reference coordinate of the pop-up window reaches the reference area of the display portion, the electronic device removes the pop-up window from the display portion. For example, if the reference coordinate 609 of the video program 607 displayed in the display portion 603 via the pop-up reaches the reference area 611 of the display portion 603 as illustrated in FIG. 6B, the electronic device 601 removes the display of the video program 607 from the display portion 603 as illustrated in FIG. 6C. In this case, the electronic device may display an icon 621 capable of redisplaying the video program 607 of which the display is removed from the display portion. For example, if at least one input is detected for the icon 621 (such as a position movement input, a touch input made for a time longer than a reference time, and a touch input attempted more than reference times), then the electronic device may redisplay the video program as illustrated in FIG. 6A.

In addition, if the position movement is detected on the pop-up window, the electronic device may determine whether a position movement speed reaches a reference speed. If the position movement speed for the pop-up window reaches the reference speed, the electronic device may determine the display type of the pop-up window.

In addition, if the position movement is detected from the pop-up window, the electronic device may perform, in combination, the operation of determining whether the reference coordinate of the pop-up window reaches the reference area and the operation of determining whether the position movement speed reaches the reference speed.

Thereafter, the procedure of FIG. 3 ends.

Figure 4:
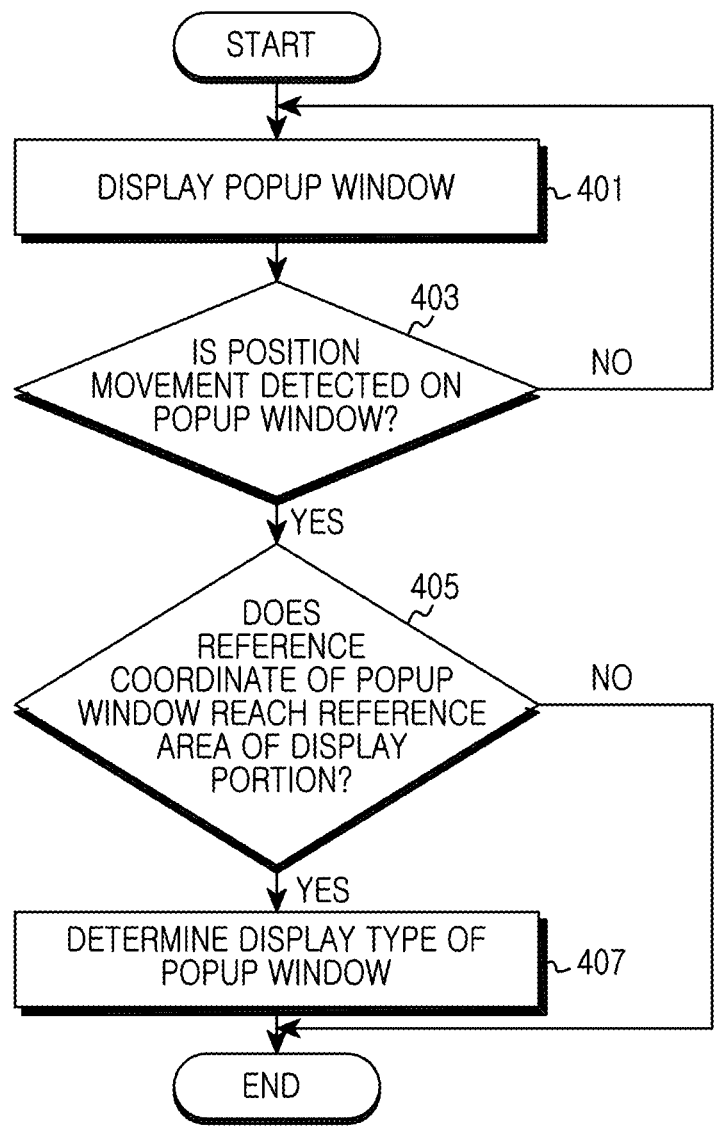
FIG. 4 is a flowchart illustrating a process of controlling a screen of an application program currently displayed via a pop-up window in an electronic device according to another example embodiment of the present disclosure.

FIG. 4 is a flowchart illustrating a process of controlling a screen of an application program currently displayed via a pop-up window in an electronic device according to another example embodiment of the present disclosure.

Referring to FIG. 4, the electronic device displays the pop-up window in step 401. For example, as illustrated in FIG. 6A, an electronic device 601 displays a video program 607 via a display portion 603 in such a manner that the video program is disposed above an Internet program 605.

After displaying the pop-up window, the electronic device determines whether a movement is detected for the pop-up window in step 403. For example, as illustrated in FIG. 6A, the electronic device 601 determines whether the movement is detected on the video program 607 displayed in a display portion 603 via a pop-up window. If movement is not detected on the pop-up window in step 403, returning to step 401, the electronic device maintains the display of the pop-up window.

Otherwise, if the position movement is detected on the pop-up window in step 403, proceeding to step 405, the electronic device determines whether a reference coordinate of the pop-up window reaches a reference area of the display portion. For example, as illustrated in FIG. 6A and FIG. 6B, if a position movement is detected on a video program 607 displayed in the display portion 603 via a pop-up window, the electronic device 601 determines whether a reference coordinate 609 of the video program 607 reaches a reference area 611 of the display portion 603.

If the reference coordinate of the pop-up window does not reach the reference area of the display unit in step 405, the procedure of FIG. 4 ends.

Otherwise, if the reference coordinate of the pop-up window reaches the reference area of the display portion in step 405, proceeding to step 407, the electronic device determines a display type of the pop-up window. For example, if the reference coordinate 609 of the video program 607 displayed in the display portion 603 via the pop-up reaches the reference area 611 of the display portion 603 as illustrated in FIG. 6B, the electronic device 601 removes the display of the video program 607 from the display portion 603 as illustrated in FIG. 6C. In this case, the electronic device may display an icon 621 capable of redisplaying the video program 607. For example, if at an input is detected on the icon 621—the input being, for example, a touch input made for a time longer than a reference time, and a touch input attempted more than reference times, etc., the electronic device can provide a control to redisplay the video program that was removed from the display portion as illustrated in FIG. 6A.

Figure 6D:

In addition, if the display of the video program is removed from the display portion, the electronic device may control whether to reproduce contents currently provided by the video program. For example, if the display of the video program is removed from the display portion while the contents are being played, the electronic device 601 may display an icon 621 in the display portion 603 to provide a control capable of pausing the playback of the contents in the video program as illustrated in FIG. 6C. Upon detecting that the icon 621 is selected, the electronic device 601 provides a control to stop the playback of the contents in the video program. In this case, the electronic device 601 may display the icon by changing it to an icon 603 capable of providing control to playback contents of the video program as illustrated in FIG. 6D. For another example, if the display of the application program is removed from the display portion and playback of the contents is stopped, the electronic device 601 may display an icon 631 capable of controlling the playback of the contents in the video program as illustrated in FIG. 6D. Upon detecting the selection of the icon 631, the electronic device 601 may provide a control to initiate playback of the contents in the video program. In this case, the electronic device 601 may change the icon 631 it to the icon 621, accompanied by functionality providing control to stop the playback of contents in the video program, as illustrated in FIG. 6C.

Thereafter, the procedure of FIG. 4 ends.

Figure 5:
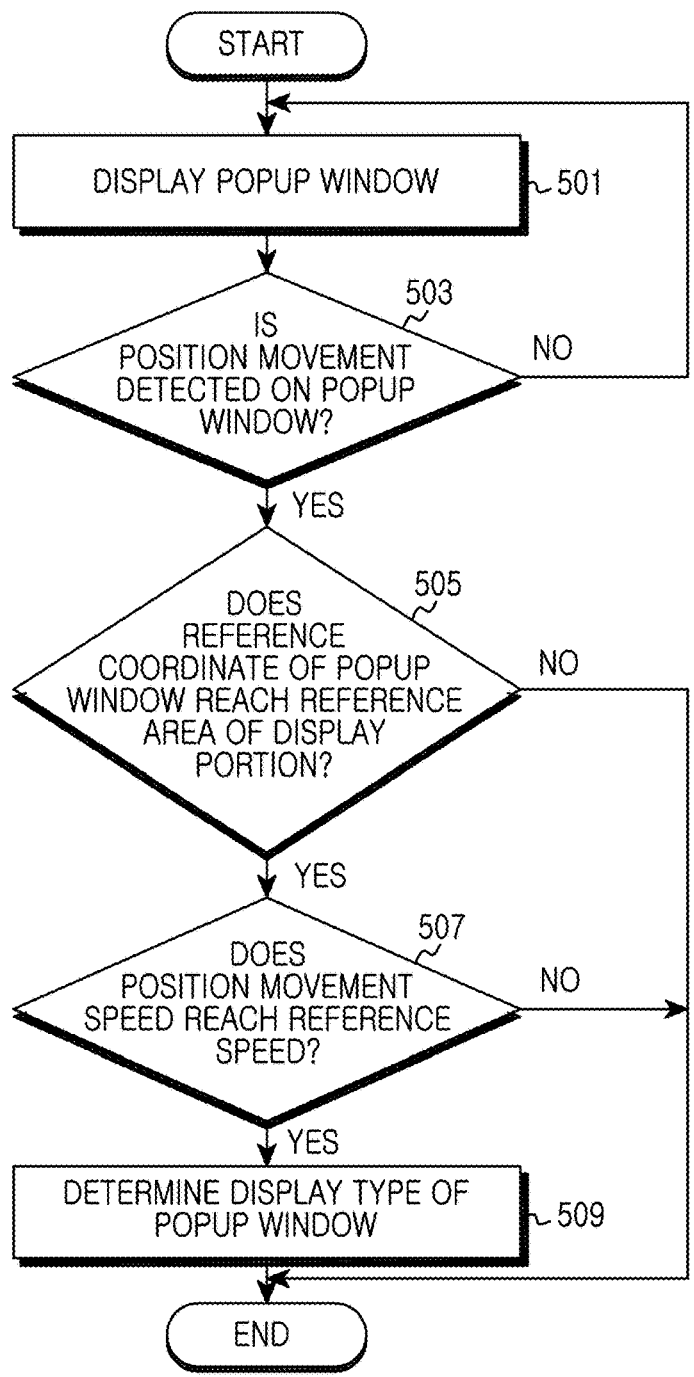
FIG. 5 is a flowchart illustrating a process of controlling a screen of an application program currently displayed via a pop-up window in an electronic device according to another example embodiment of the present disclosure.

FIG. 5 is a flowchart illustrating a process of controlling a screen of an application program currently displayed via a pop-up window in an electronic device according to another example embodiment of the present disclosure.

Referring to FIG. 5, the electronic device displays the pop-up window in step 501. For example, as illustrated in FIG. 6A, an electronic device 601 displays a video program 607 via a display portion 603 in such a manner that the video program pups up above an Internet program 605.

After displaying the pop-up window, the electronic device determines whether movement is detected on the pop-up window in step 503. For example, as illustrated in FIG. 6A, the electronic device 601 determines whether movement is detected on the video program 607 displayed in a display portion 603 via a pop-up. If movement is not detected on the pop-up window in step 503, returning to step 501, the electronic device maintains display of the pop-up window.

Otherwise, if movement is detected on the pop-up window in step 503, proceeding to step 505, the electronic device determines whether a reference coordinate of the pop-up window reaches a reference area of the display portion. For example, as illustrated in FIG. 6A and FIG. 6B, if movement is detected on a video program 607 displayed in the display portion 603 via a pop-up, the electronic device 601 determines whether a reference coordinate 609 of the video program 607 reaches a reference area 611 of the display portion 603.

If the reference coordinate of the pop-up window does not reach the reference area of the display unit in step 505, the procedure of FIG. 5 ends.

Otherwise, if the reference coordinate of the pop-up window reaches the reference area of the display portion in step 505, proceeding to step 507, the electronic device determines whether a position movement speed reaches a reference speed.

If the position movement speed does not reach the reference speed in step 507, the procedure of FIG. 5 ends.

Otherwise, if the position movement speed reaches the reference speed in step 507, proceeding to step 509, the electronic device determines a display type of the pop-up window. For example, if the reference coordinate 609 of the video program 607 displayed in the display portion 603 via the pop-up reaches the reference area 611 of the display portion 603 as illustrated in FIG. 6B, the electronic device 601 removes the display of the video program 607 from the display portion 603 as illustrated in FIG. 6C. In this case, the electronic device may display an icon 621 capable of redisplaying the video program 607 of which the display is removed from the display portion. For example, if at least one input is detected for the icon 621 (such as a position movement input, a touch input made for a time longer than a reference time, and a touch input attempted more than reference times), then the electronic device can redisplay the video program of which the display is removed from the display portion as illustrated in FIG. 6A.

In addition, if the display of the video program is removed from the display portion, the electronic device may determine whether to playback contents currently provided by the video program. For example, if the display of the video program is removed from the display portion while the contents are played, the electronic device 601 may display an icon 621 in the display portion 603 providing a control capable of pausing the playback of the contents in the video program as illustrated in FIG. 6C. Upon detecting that the icon 621 is selected, the electronic device 601 provides a control to stop the playback of the contents in the video program. In this case, the electronic device 601 may display the icon by changing it to an icon 603 capable of providing control to playback contents of the video program as illustrated in FIG. 6D.

In another example, if the display of the application program is removed from the display portion when the playback of the contents is stopped, the electronic device 601 may display the icon 631 capable of controlling the playback of the contents in the video program as illustrated in FIG. 6D. Upon detecting that the icon 631 is selected, the electronic device 601 provides a control to playback the contents in the video program. In this case, the electronic device 601 may display the icon by changing it to the icon 621 capable of providing control to stop the playback of contents in the video program as illustrated in FIG. 6C.

Thereafter, the procedure of FIG. 5 ends.

Figure 7A:
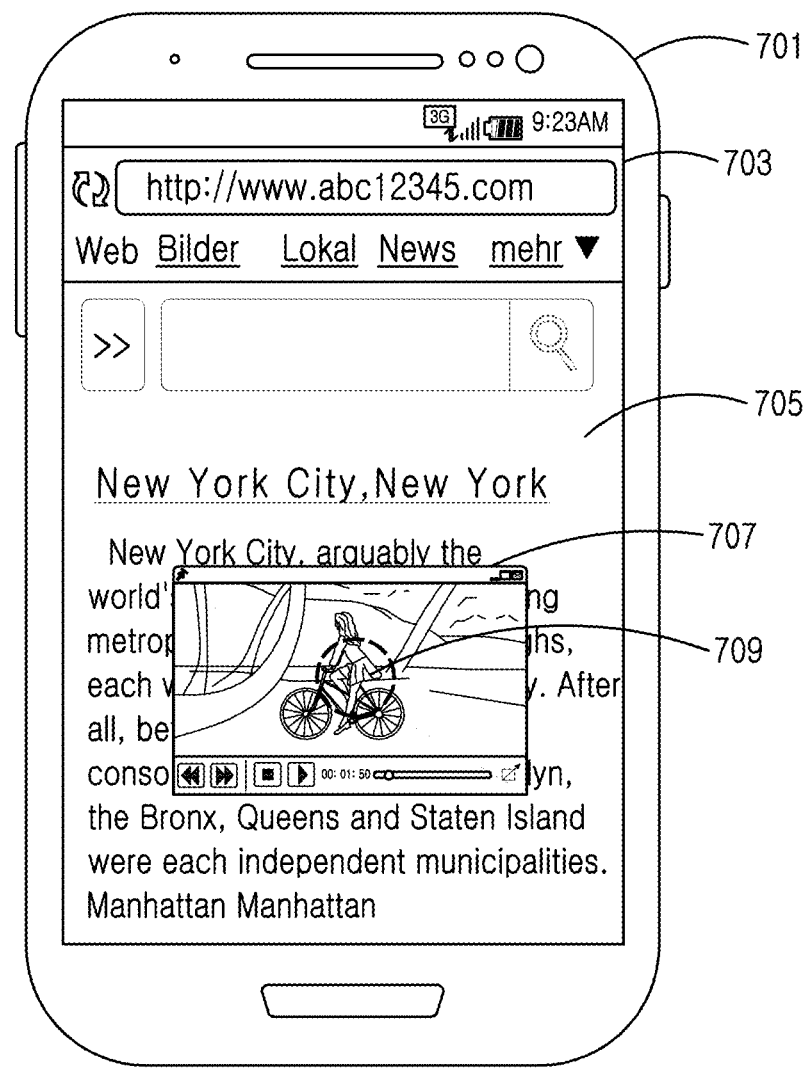
FIG. 7A, FIG. 7B, FIG. 7C and FIG. 7D illustrate a screen configuration for controlling a screen of an application program currently displayed via a pop-up window in an electronic device according to an example embodiment of the present disclosure.
Figure 7B:
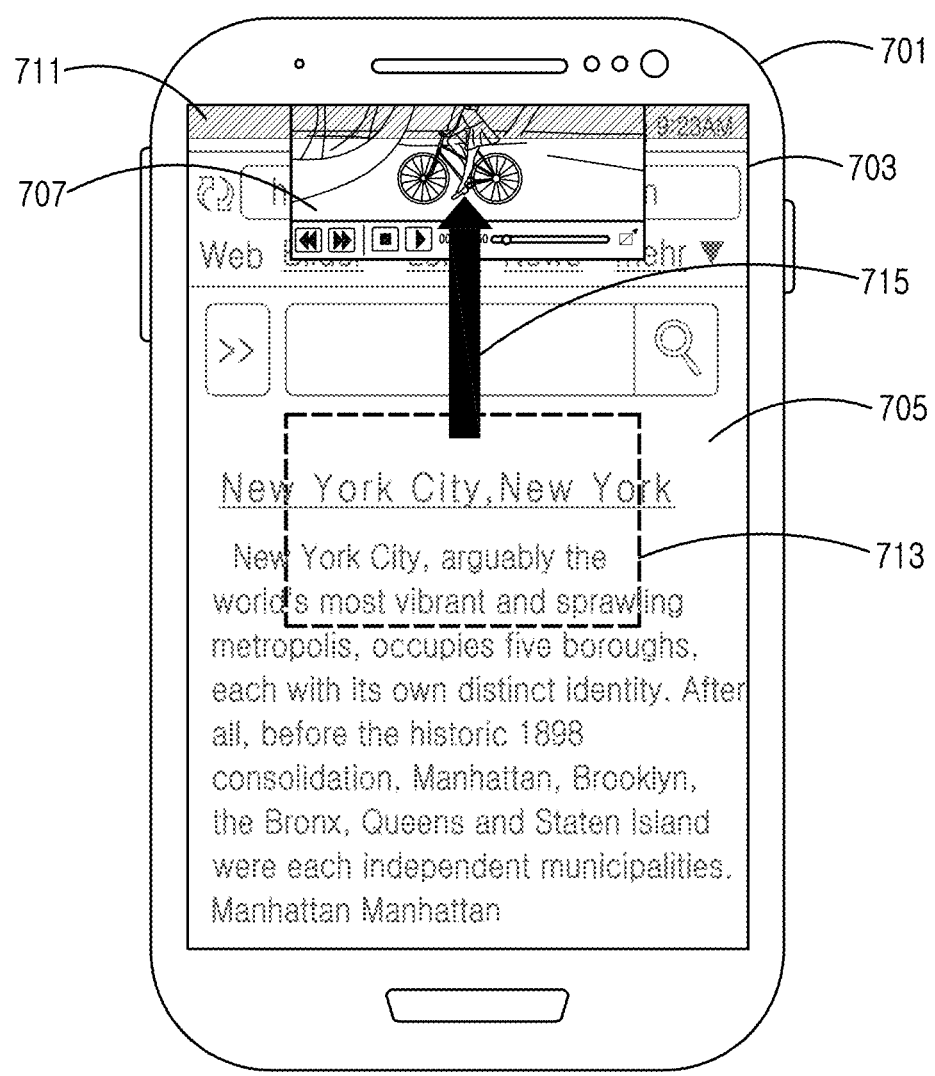
Figure 7C:
Figure 7D:
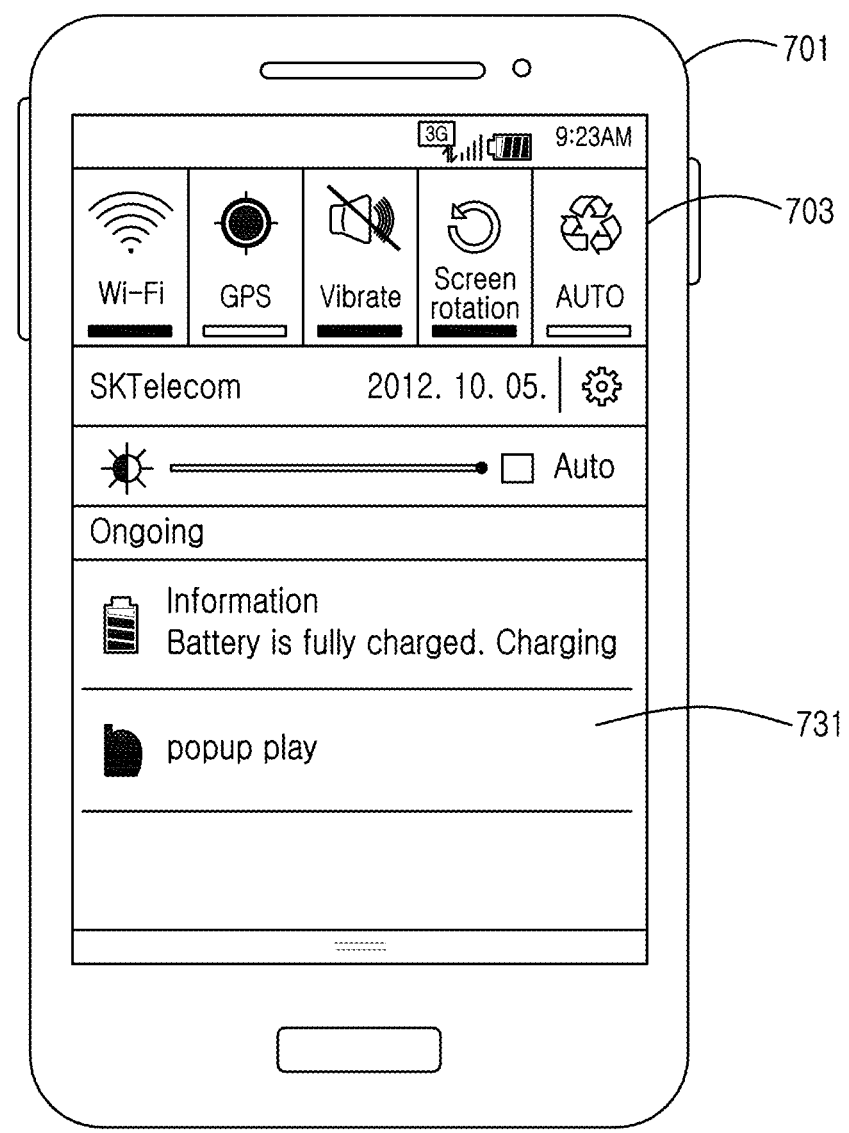

In addition, as illustrated in FIG. 7A and FIG. 7B, if a position movement is detected on a video program 707 displayed in a display portion 703 via a pop-up, the electronic device 701 determines whether a reference coordinate 709 of the video program 707 reaches a reference area 711 of the display portion 703. If the reference coordinate 709 of the video program 707 reaches the reference area 711 (of FIG. 7B) of the display portion 703, the electronic device 701 removes the display of the video program 707 from the display portion 703 as illustrated in FIG. 7C. In this case, the electronic device may provide a control to redisplay the video program. For example, as illustrated in FIG. 7C, if at least one input is detected on a top bar 721 among a position movement input, a touch input (such as a touch input made for a time longer than a reference time, or a touch input attempted more than a predefined number of reference inputs), the electronic device 701 displays a quick panel including at least one control menu (e.g., Wi-Fi setting, GPS setting, vibration setting, and auto-rotation setting) in the display portion 703, as illustrated in FIG. 7D. In this case, upon detecting that a "pop-up play" 731 is selected in the quick panel, the electronic device may redisplay a video program, returning the device to the state illustrated in FIG. 7A.

Figure 8A:
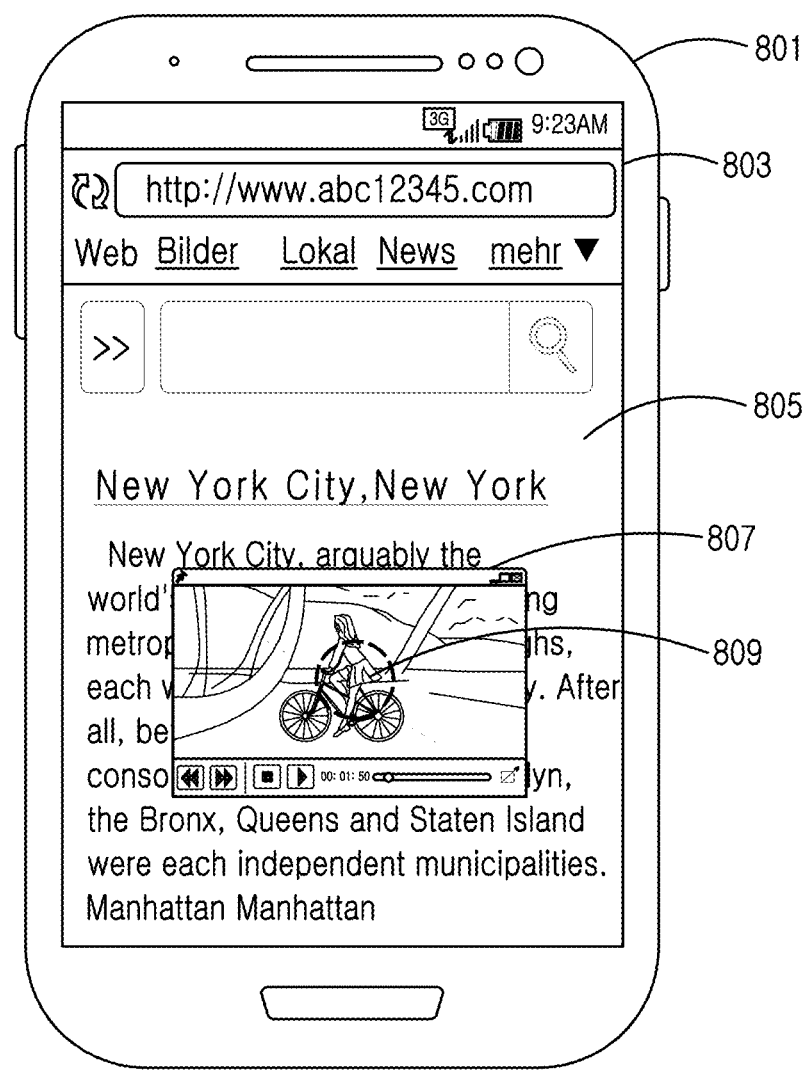
FIG. 8A, FIG. 8B, FIG. 8C and FIG. 8D illustrate a screen configuration for controlling a screen of an application program currently displayed via a pop-up window in an electronic device according to an example embodiment of the present disclosure.
Figure 8B:
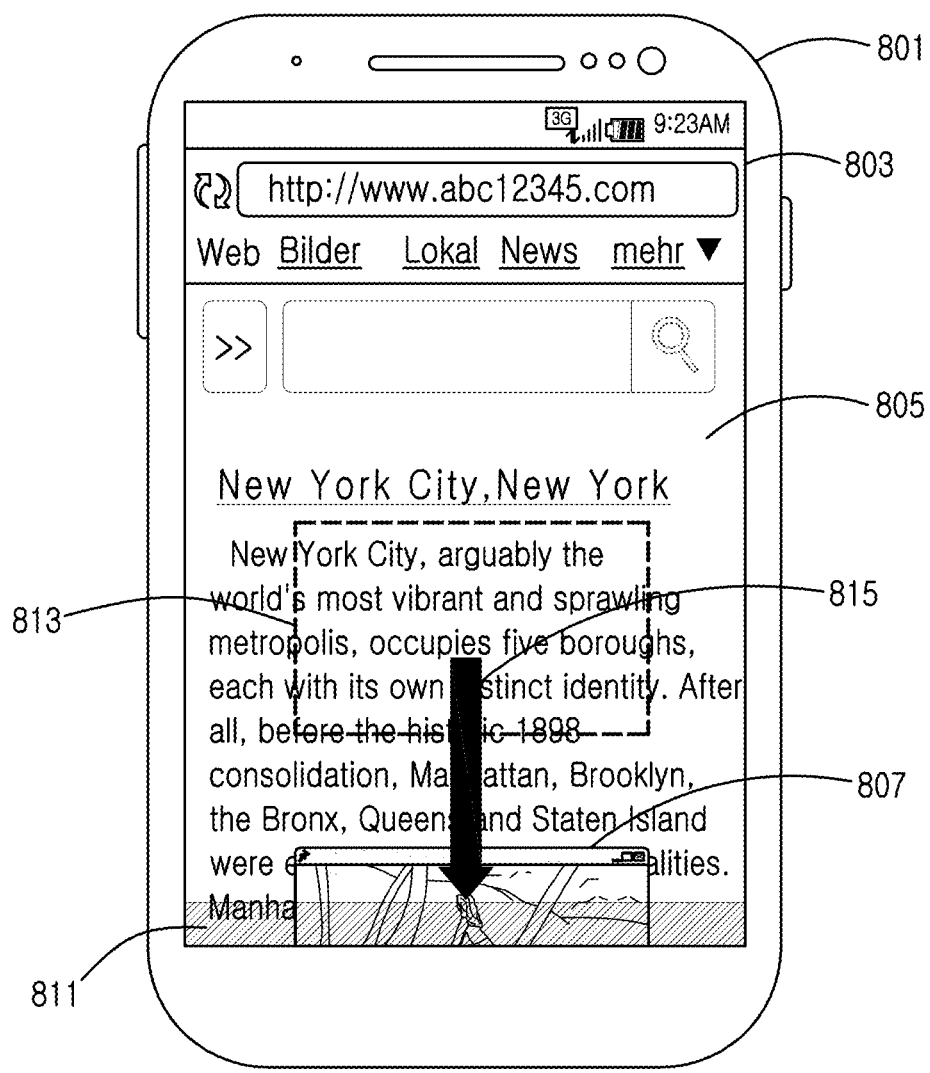
Figure 8C:
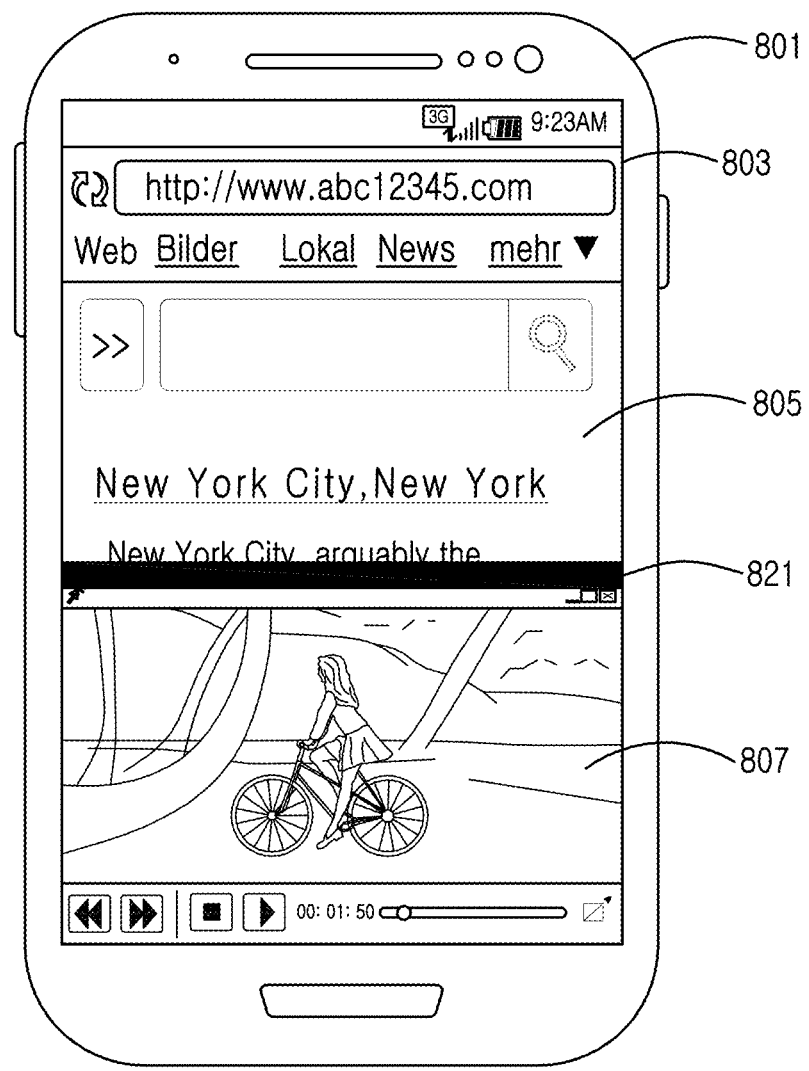
Figure 8D:
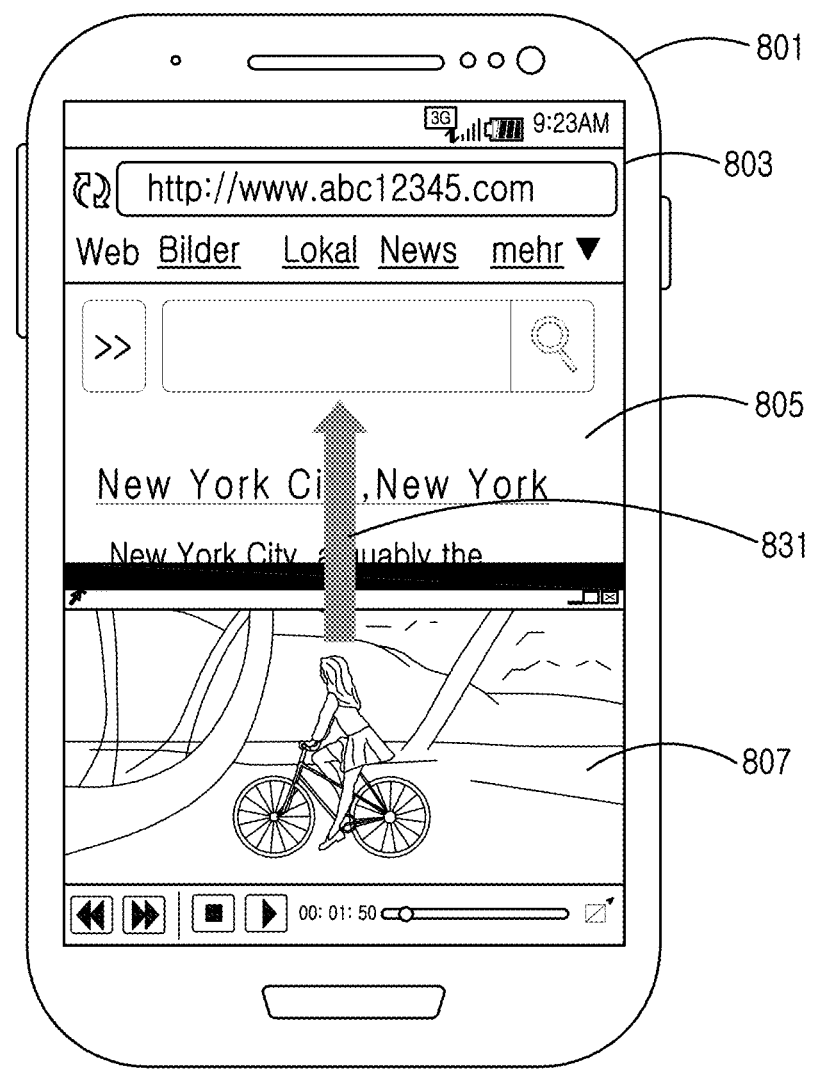

In addition, as illustrated in FIG. 8A and FIG. 8B, if a position movement is detected on a video program 807 displayed in a display portion 803 via a pop-up, the electronic device 801 determines whether a reference coordinate 809 of the video program 807 reaches a reference area 811 of the display portion 803. If the reference coordinate 809 of the video program 808 reaches the reference area 811 (of FIG. 8B) of the display portion 803, the electronic device 801 may display an Internal program 805 and the video program 807 in a multi-view mode. In this case, upon detection of movement 831 (of FIG. 8D) on the video program 807 of FIG. 8C displayed in the multi-view mode, the electronic device 801 may redisplay the video program 807 via a pop-up window, returning the display to the state illustrated in FIG. 8A. Herein, the multi-view mode indicates that screens of two or more application programs are simultaneously displayed in a pre-set area of the display portion.

In addition, if a first area of the pop-up window reaches a second area of the display portion, the electronic device may determine a display type of the pop-up window by confirming whether an operation state of the electronic device is a landscape mode or a portrait mode.

As described above, an electronic device provides an interface for removing a pop-up window from a display portion or for redisplaying the pop-up window removed from the display portion. Accordingly, there is an advantage in that a user of the electronic device can more easily manipulate the pop-up window.

It will be appreciated that embodiments of the present disclosure according to the claims and description in the specification can be realized in the form of hardware, software or a combination of hardware and software. Any such software may be stored in a non-transient computer readable storage medium. The non-transient computer readable storage medium stores one or more programs (software modules), the one or more programs comprising instructions, which when executed by one or more processors in an electronic device, cause the electronic device to perform a method of the present disclosure. Any such software may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape or the like. It will be appreciated that the storage devices and storage media are embodiments of machine-readable storage that are suitable for storing a program or programs comprising instructions that, when executed, implement embodiments of the present disclosure. Accordingly, embodiments provide a program comprising code for implementing apparatus or a method as claimed in any one of the claims of this specification and a machine-readable storage storing such a program. Still further, such programs may be conveyed electronically via any medium such as a communication signal carried over a wired or wireless connection and embodiments suitably encompass the same.

While the present disclosure has been particularly shown and described with reference to example embodiments thereof, it will be understood by those skilled in the art that various changes in form and details may be made therein without departing from the spirit and scope of the present disclosure as defined by the appended claims.

Any of the functions and steps provided in the Figures may be implemented in hardware, software or a combination of both and may be performed in whole or in part within the programmed instructions of a computer. No claim element herein is to be construed under the provisions of 35 U.S.C. 112, sixth paragraph, unless the element is expressly recited using the phrase "means for".

The functions and process steps herein may be performed automatically or wholly or partially in response to user command. An activity (including a step) performed automatically is performed in response to executable instruction or device operation without user direct initiation of the activity.

The terms "unit" or "module" referred to herein is to be understood as comprising hardware such as a processor or microprocessor configured for a certain desired functionality, or a non-transitory medium comprising machine executable code, in accordance with statutory subject matter under 35 U.S.C. § 101 and does not constitute software per se.

What is claimed is:

1. A method of in an electronic device, the method comprising:
    displaying an application program in a display area of the electronic device;
    displaying a pop-up window over at least a portion of the application program; in response to movement of the pop-up window by a position movement input on the pop-up window made by a user, removing from display a part of the pop-up window that is moved outside the display area while maintaining display of a remainder of the pop-up window,
    detecting whether a reference portion of the pop-up window contacts a predefined area of the display area while the position movement input on the pop-up window is maintained by the user;
    in response to the detection of the reference portion of the pop-up window contacting the predefined area, removing the remainder of the pop-up window from the display area and displaying, in the display area, a new selectable icon corresponding to the pop-up window for a subsequent redisplay over at least a portion of the application program; and
    in response to an input made on the new selectable icon, redisplaying the pop-up window, wherein the input made on the new selectable icon to redisplay the pop-up window includes a multi-touch input to the new selectable icon detected more than a threshold number of times,
    wherein a first portion of the pop-up window is gradually removed from display while a second portion of the pop-up window continues to be displayed in the display area as the reference portion of the pop-up window moves towards contact with the predefined area of the display area, until contact between the reference portion of the pop-up window and the predefined area of the display area is detected,
    wherein an entirety of the new selectable icon is visually different from any portion of the pop-up window, and
    wherein the new selectable icon is at least partially displayed within a physical portion of the display from which the remainder of the pop-up window is removed when the reference portion contacted the predefined area.

2. The method of claim 1, further comprising detecting whether a movement speed of the pop-up window reaches a reference speed.

3. The method of claim 2, further comprising, removing the pop-up window from the display in response to the movement speed reaching the reference speed.

4. The method of claim 1, wherein the new selectable icon further comprises displaying an operation state of the pop-up window.

5. The method of claim 4, further comprising changing the operation state of the pop-up window in response to detecting selection of the icon.

6. The method of claim 1, further comprising, responsive to the reference portion of the pop-up window reaching the predefined area of the display area, detecting whether an operation state of the electronic device is configured to be a landscape mode or a portrait mode.

7. The method of claim 6, further comprising determining a display configuration of the pop-up window by according to the operation state of the electronic device.

8. An electronic device comprising:
    a display unit having a display area;
    a memory; and
    a processor configured to:
        display an application program in the display area,
        display a pop-up window over at least a portion of the application program,
        in response to movement of the pop-up window by a position movement input on the pop-up window made by a user, remove from display a part of the pop-up window that is moved outside the display area while maintaining display of a remainder of the pop-up window,
    detect whether a reference portion of the pop-up window contacts a predefined area of the display area while the position movement input on the pop-up window is maintained by the user,
        in response to detecting the reference portion of the pop-up window contacting the predefined area, remove the remainder of the pop-up window from the display area, display, in the display area, a new selectable icon corresponding to the pop-up window for a subsequent, redisplay over at least a portion of the application program, and
        in response to an input made on the new selectable icon, redisplay the pop-up window, wherein the input made on the new selectable icon to redisplay the pop-up window includes a multi-touch input to the new selectable icon detected more than a threshold number of times,
    wherein a first portion of the pop-up window is gradually removed from display while a second portion of the pop-up window continues to be displayed in the display area as the reference portion of the pop-up window moves towards contact with the predefined area of the display area, until contact between the reference portion of the pop-up window and the predefined area of the display area is detected,
    wherein an entirety of the new selectable icon is visually different from any portion of the pop-up window, and
    wherein the new selectable icon is at least partially displayed within a physical portion of the display from which the remainder of the pop-up window is removed when the reference portion contacted the predefined area.

9. The electronic device of claim 8, wherein the processor is configured to detect whether a movement speed of the pop-up window reaches a reference speed.

10. The electronic device of claim 9, wherein the processor is configured to remove the pop-up window from the display area responsive to the movement speed reaching the reference speed.

11. The electronic device of claim 8, wherein the processor is configured to display on the new selectable icon an operation state of the pop-up window.

12. The electronic device of claim 11, wherein in response to detecting selection of the new selectable icon, the processor is configured to change the operation state of the pop-up window.

13. The electronic device of claim 8, wherein the processor is configured to confirm whether an operation state of the electronic device is configured as a landscape mode or a portrait mode.

14. The electronic device of claim 13, wherein the processor is configured to determine a display type of the pop-up window according to the operation state of the electronic device.

15. An electronic device comprising:
a display unit having a display area;
a memory; and
a processor configured to:
   display a pop-up window including content in the display area,
   in response to movement of the pop-up window via a position movement input on the pop-up window made by a user, removing from display a part of the pop-up window that is moved outside the display area while maintaining display of a remainder of the pop-up window,
   detect whether a reference portion of the pop-up window contacts one of a plurality of predefined areas of the display area while the position movement input on the pop-up window is maintained by the user, and
   change display of the pop-up window differently according to which of the plurality of predefined areas is contacted,
wherein the remainder of the pop-up window is removed from display when contacting a first predefined area, and a new selectable icon is displayed corresponding to the pop-up window for a subsequent redisplay over at least a portion of an application program in the display area,
wherein the input made on the new selectable icon to redisplay the pop-up window includes a multi-touch input to the new selectable icon detected more than a threshold number of times,
wherein a first portion of the pop-up window is gradually removed from display while a second portion of the pop-up window continues to be displayed in the display area as the reference portion of the pop-up window moves towards contact with the predefined area of the display area until contact is detected,
wherein an entirety of the new selectable icon is visually different from any portion of the pop-up window, and
wherein the new selectable icon is at least partially displayed within a physical portion of the display unit from which the remainder of the pop-up window is removed when the reference portion contacted the first predefined area.

16. The electronic device of claim 15, wherein the processor is configured to detect whether an application program is currently displayed in the display area in response to the reference portion of the pop-up window contacting one of the plurality of predefined areas.

17. The electronic device of claim 16, wherein the processor is configured to:
in response to detecting the reference portion contacts a second predefined area, remove the pop-up window from the display area and simultaneously displaying the application program and the content of the pop-up window in preset areas of the display in a multi-view mode.

18. The electronic device of claim 17, wherein:
when the reference portion contacts the second predefined area, the displayed content in the multi-view mode is selectable to recover the removed pop-up window, and
when the reference portion contacts a third predefined area, the pop-up window is removed and a region including display of at least a signal strength and a battery level is selectable to recover the removed pop-up window.

* * * * *